United States Patent [19]

Hara et al.

[11] Patent Number: 4,673,032

[45] Date of Patent: Jun. 16, 1987

[54] RADIATOR AND OIL COOLING APPARATUS FOR MOTOR VEHICLES

[75] Inventors: Kunitaka Hara; Yoshihiro Matsuo, both of Kawagoe, Japan

[73] Assignee: Honda, Wako, Japan

[21] Appl. No.: 805,594

[22] Filed: Dec. 10, 1985

Related U.S. Application Data

[62] Division of Ser. No. 534,870, Sep. 22, 1983, abandoned.

[30] Foreign Application Priority Data

| | | | |
|---|---|---|---|
| Sep. 22, 1982 | [JP] | Japan | 57-166299 |
| Sep. 22, 1982 | [JP] | Japan | 57-144535[U] |
| Sep. 22, 1982 | [JP] | Japan | 57-166298 |

[51] Int. Cl.[4] .................. B60H 1/10

[52] U.S. Cl. .................. 165/44; 165/144; 180/229

[58] Field of Search .................. 165/44, 144, 172; 180/229, 68.4

[56] References Cited

U.S. PATENT DOCUMENTS

| | | | |
|---|---|---|---|
| 1,598,048 | 8/1926 | Burmeister | 165/144 |
| 1,833,424 | 11/1931 | Jansson | 180/68.4 |
| 2,235,806 | 3/1941 | Walker et al. | 165/144 |
| 2,334,915 | 11/1943 | Findley | 165/44 |
| 2,789,647 | 4/1957 | Couse | 180/68.4 |
| 4,019,595 | 4/1977 | Imai et al. | 180/229 |
| 4,153,106 | 5/1979 | Sonada et al. | 165/44 |
| 4,428,451 | 1/1984 | Yamaoka | 180/229 |
| 4,516,630 | 5/1985 | Yamaguchi | 180/229 |

FOREIGN PATENT DOCUMENTS

| | | | |
|---|---|---|---|
| 58511 | 4/1982 | Japan | 180/229 |
| 136518 | 8/1983 | Japan | 180/229 |
| 397786 | 8/1933 | United Kingdom | 180/68.4 |
| 419029 | 11/1934 | United Kingdom | 180/68.4 |
| 842828 | 7/1960 | United Kingdom | 165/172 |

*Primary Examiner*—Robert E. Garrett
*Assistant Examiner*—John Kwon
*Attorney, Agent, or Firm*—Pollock, Vande Sande & Priddy

[57] ABSTRACT

Radiator for a two-wheeled motor vehicle with a lateral V-type crankshaft straddle type engine. The radiator is attached to the front section of the down tubes and comprises an upper section between an upper tank connected to coolant recovery piping and a middle tank, and a pair of lower sections between the middle tank and a pair of lower tanks supplying coolant piping at both sides. One of the lower tanks is lower than the other, with a connecting pipe between them inclined so as to equalize the coolant flow speed.

3 Claims, 11 Drawing Figures

RADIATOR AND OIL COOLING APPARATUS FOR MOTOR VEHICLES

This is a divisional of co-pending application Ser. No. 534,870 filed on Sept. 22, 1983, now abandoned.

SUMMARY OF THE INVENTION

The invention relates to a radiator apparatus and oil cooling apparatus for a motor vehicle.

BACKGROUND OF THE INVENTION

The present invention is intended to provide an appropriate and satisfactory radiator apparatus for use in a large scale motor vehicle, e.g., a two-wheeled motor vehicle which has what is termed a lateral V-type crankshaft straddle type engine.

Such vehicle usually has a water cooled engine, and as a result is also equipped with a radiator to cool down the coolant which gets heated up by the engine. This radiator is located so as to receive the full cooling effect of wind as the vehicle moves, and is placed in back of the front wheel; that is, it is fastened to the front section of the down tubes which form a part of the vehicle body frame.

It happens that, in cases where use is made of a lateral V-type crankshaft straddle type engine, with a pair of cylinders, front and rear inclined, as in large scale two-wheeled motor vehicles, part of the engine, inclined towards the front, particularly the cylinder head section, protrudes towards the front section of the down tubes, limiting the space for the installation of the radiator, and causing a problem as a result.

On the other hand, since there are tanks used for temporary storage of coolant above and below, and also due to considerations of efficiency and of construction requirements, radiators are generally front facing.

As a consequence, in the case of large scale two-wheeled motor vehicles having lateral V-type crankshaft straddle type engines, it has to date been impossible, due to restrictions on installation space, to use a large scale radiator with full cooling capabilities. Where, in order to provide for the enlargement of the radiator, a horizontal type, with the upper and lower tanks placed toward the right and left, has been selected, due to the fact that the lower middle section of the radiator core is turned upwards, and the lower section is made in a concave form, the engine section, previously mentioned, which protruded towards this concave section could fit through. However, even in such a structure there were limitations on the design of larger scale models, in particular because there were shortcomings in efficiency resulting from the fact that the radiator is made up of a large number of thin tubes aligned in a row, and, in order to carry out heat release for the heated coolant which is made to pass through these tubes, the length of the tubes varied, so that partial imbalances of coolant flow pressure would arise, making good and effective cooling infeasible.

OBJECT OF THE INVENTION

The present invention is intended to overcome these problems, and, in addition to making the shape of the radiator as a whole such that maximum effective use can be made of the available installation space, has as its object a two-wheeled motor vehicle radiator apparatus capable of functioning like a large scale cooling capacity radiator, due to the selection of a structure which, though not square, shows no loss in cooling efficiency.

This object is achieved by use of a two-wheeled motor vehicle radiator apparatus where part of the engine protrudes towards the front section of the down tubes, the radiator apparatus being fastened to this front section of the down tubes, and its main structure has the special features that it is made up in unitary fashion of an upper radiator section, constructed so that it is interposed through an upper radiator core, which has cooling fins, between an upper tank connected to coolant recovery piping and a middle tank installed in the area therebelow, and a pair of lower radiator sections, constructed so that they are interposed through a lower radiator core, which has cooling fins, between the middle tank and a pair of lower tanks, left and right, supplying coolant piping placed at both sides below the upper radiator section.

BRIEF INTRODUCTION TO THE DRAWINGS

In order that the invention may be more clearly understood, reference will now be made to the accompanying drawings, wherein several embodiments are shown for purposes of illustration, and wherein.

DESCRIPTION OF PREFERRED EMBODIMENT

Figure 1:
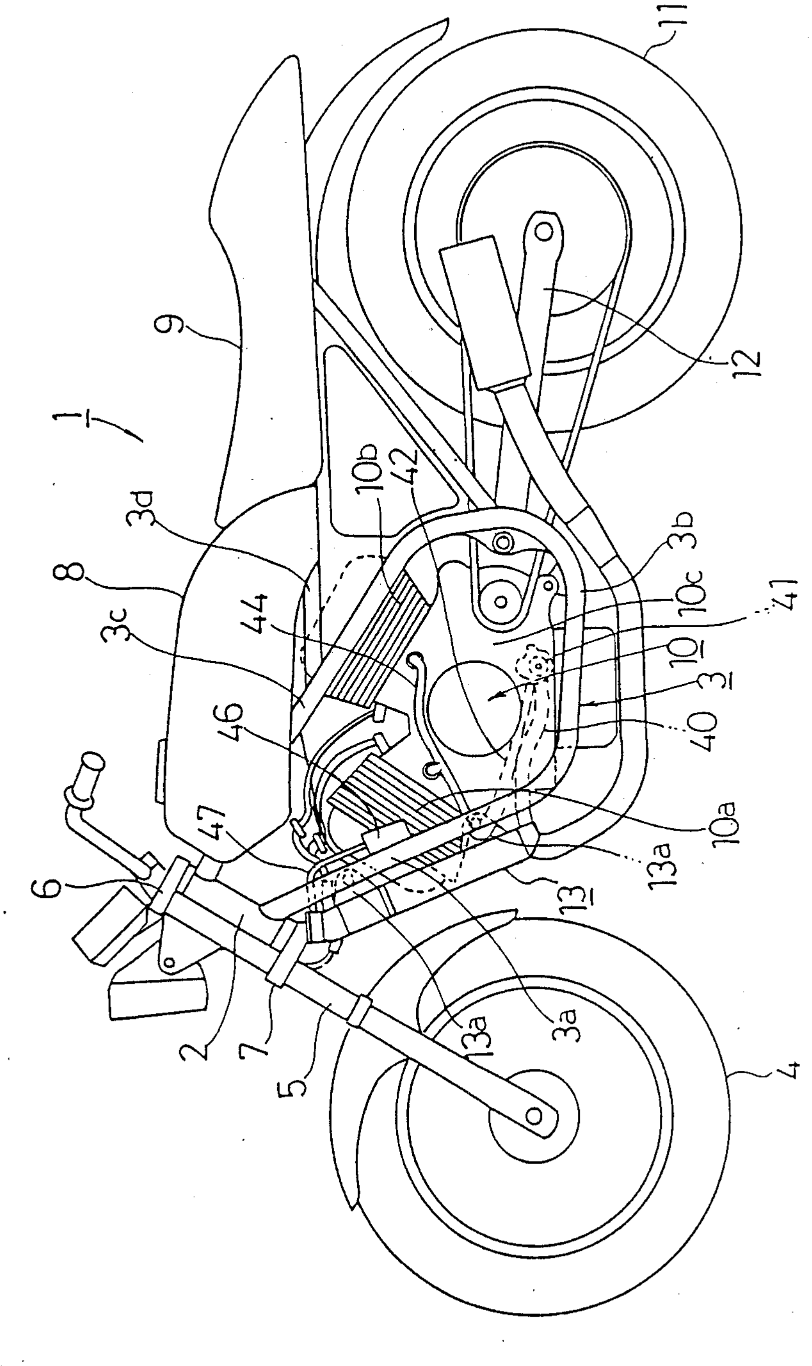
FIG. 1 is an outline side view of the two-wheeled motor vehicle carrying the radiator apparatus according to the present invention.

In FIG. 1, the two-wheeled motor vehicle 1 has a vehicle body frame 3, which in turn is made up of down tubes 3*a*, sloping down from below head tube 2, lower down tubes 3*b*, extending further back from the lower parts of down tubes 3*a*, as well as main frame 3*c*, extending back from the upper part of head tube 2, and, extending back from the middle of main frame 3*c*, seat rail frame 3*d*. There is also front fork 5, supporting front wheel 4, which is surrounded above and below and held by bridges 6 and 7. In addition, on top of main frame 3*c*, extending toward the rear of the vehicle tube 2, there is placed fuel tank 8, and, behind this, on top of seat frame 3*d*, a seat 9. Further, above lower down tube 3*b* there is placed the engine unit 10, comprising a pair of 2-cylinder engines 10*a*, 10*b*, with cylinders sloping front and rear, i.e., four cylinders altogether, with a part of the front 2-cylinder engine 10*a*, in particular the cylinder head, protruding towards down tube 3*a*. Furthermore, attached to main frame 3*c* there is rear fork 12, supporting rear wheel 11 on either side and a rear cushion unit between rear fork 12 and vehicle body frame 3 (not shown).

In front of down tubes 3*a,* there is placed radiator apparatus 13. The parts of down tubes 3*a* which extend rearwardly from head tube 2, branching out on the left and right sides from the vehicle body, are down tube members 3*a*-1 and 3*a*-2, respectively. The radiator apparatus 13 is attached to the vehicle frame sides by means of brackets 13*a,* at points in the lower part of radiator 13, fastened to down tubes 3*a.*

Figure 4:
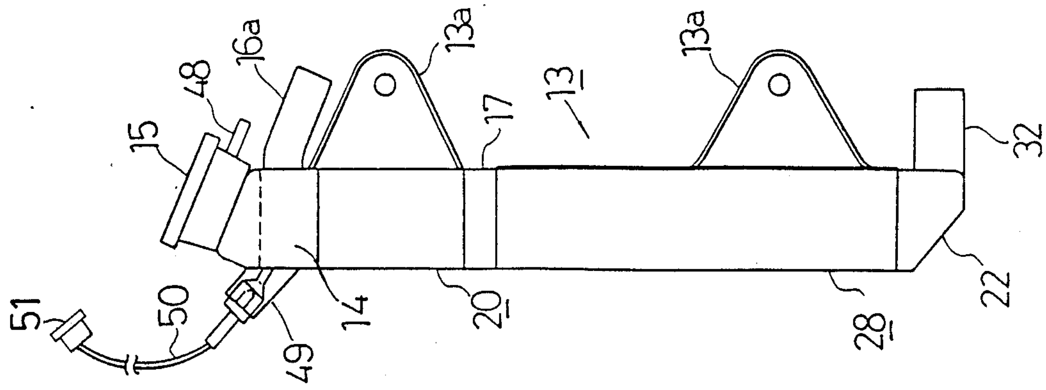
FIG. 4 is a side view of the apparatus shown in FIG. 3.
Figure 3:
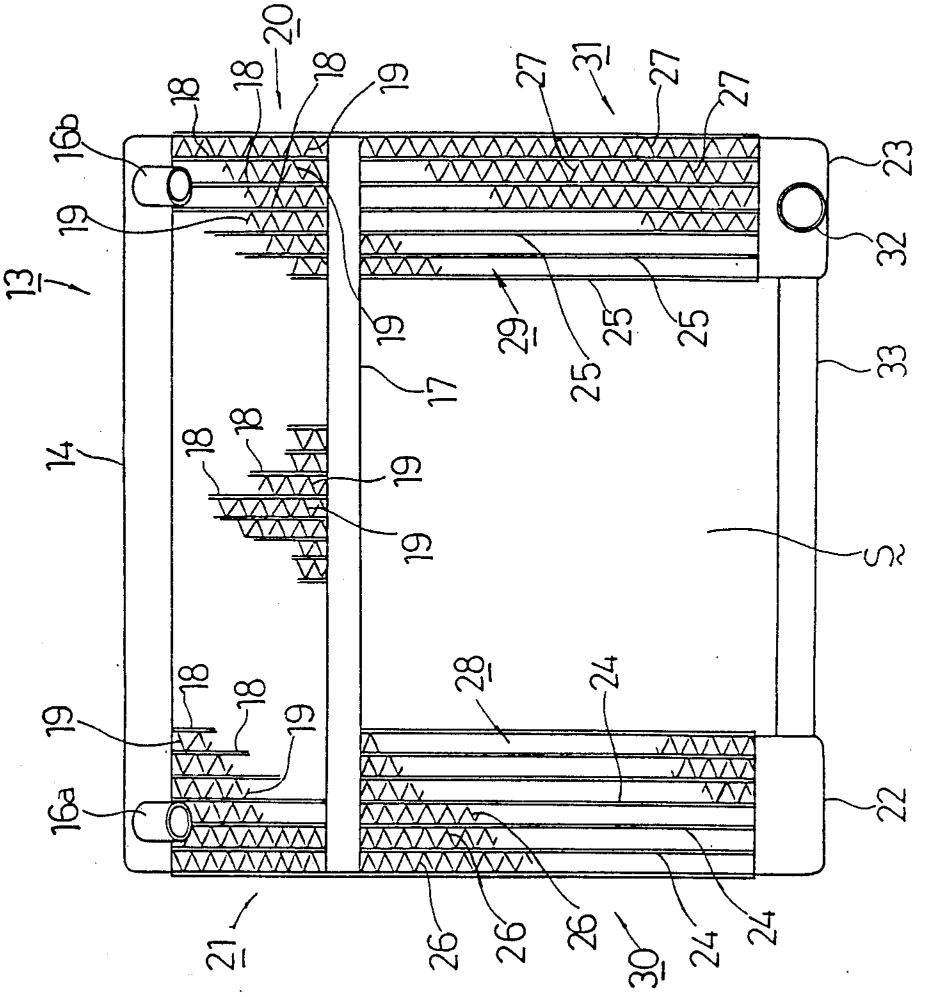
FIG. 3 is a rear view of a first embodiment of the radiator apparatus according to the invention.

With reference now to FIGS. 3 and 4, radiator apparatus 13 is topped by a horizontal, long and thin upper tank 14, provided at its top with radiator cap 15. Both ends of upper tank 14 are provided with coolant supply openings 16*a* and 16*b,* connected to the coolant circulation tubes from the pair of 2-cylinder engines 10*a* and 10*b.*

Below upper tank 14, in the middle and generally parallel to upper tank 14, there is placed horizontally long and thin middle tank 17. A number of thin tubes 18 extend between and join middle tank 17 and upper tank 14. Among these tubes 18 are interspersed cooling fins 19, arranged in undulating from, making up the upper radiator core 20. Together, the upper tank 14, the radiator core 20, and the middle tank 17 constitute the upper radiator section 21. The frontal configuration of upper radiator section 21 puts into play the general capabilities of a square type of radiator.

Below the upper radiator section 21, on the left-hand and right-hand sides are a pair of lower tanks 22 and 23, the upper parts which are connected to the bottom of the two ends of middle tank 17 by means of tubes 24 and 25, respectively. There are also interspersed fins 26 and 27, to form lower radiator cores 28 and 29. Thus, one side of middle tank 17 (the left-hand side), lower radiator core 28, and lower tank 22 together constitute lower radiator section 30. On the other (right) side of middle tank 17 the lower radiator core 29 and lower tank 23 together constitute lower radiator section 31. Each of this pair of lower tanks is independent, and has the capacities of an ordinary radiator.

Further, on the lower tank on one side, at the bottom of lower tank 23 in the case of the present example, there is installed an outlet 32 connected to the coolant supply piping leading to engine unit 10. In addition, tanks 22 and 23 are connected to one another by connecting pipe 33.

If radiator device 13 is considered in terms of its component parts, it will be seen to comprise three independent radiator sections, and to have an overall shape like an inverted "U", open at the bottom, forming a space S between lower radiator sections 22 and 23, thereby making it possible for the above mentioned part of the engine which protrudes forward to be accommodated between the legs of the "U".

Figure 2:
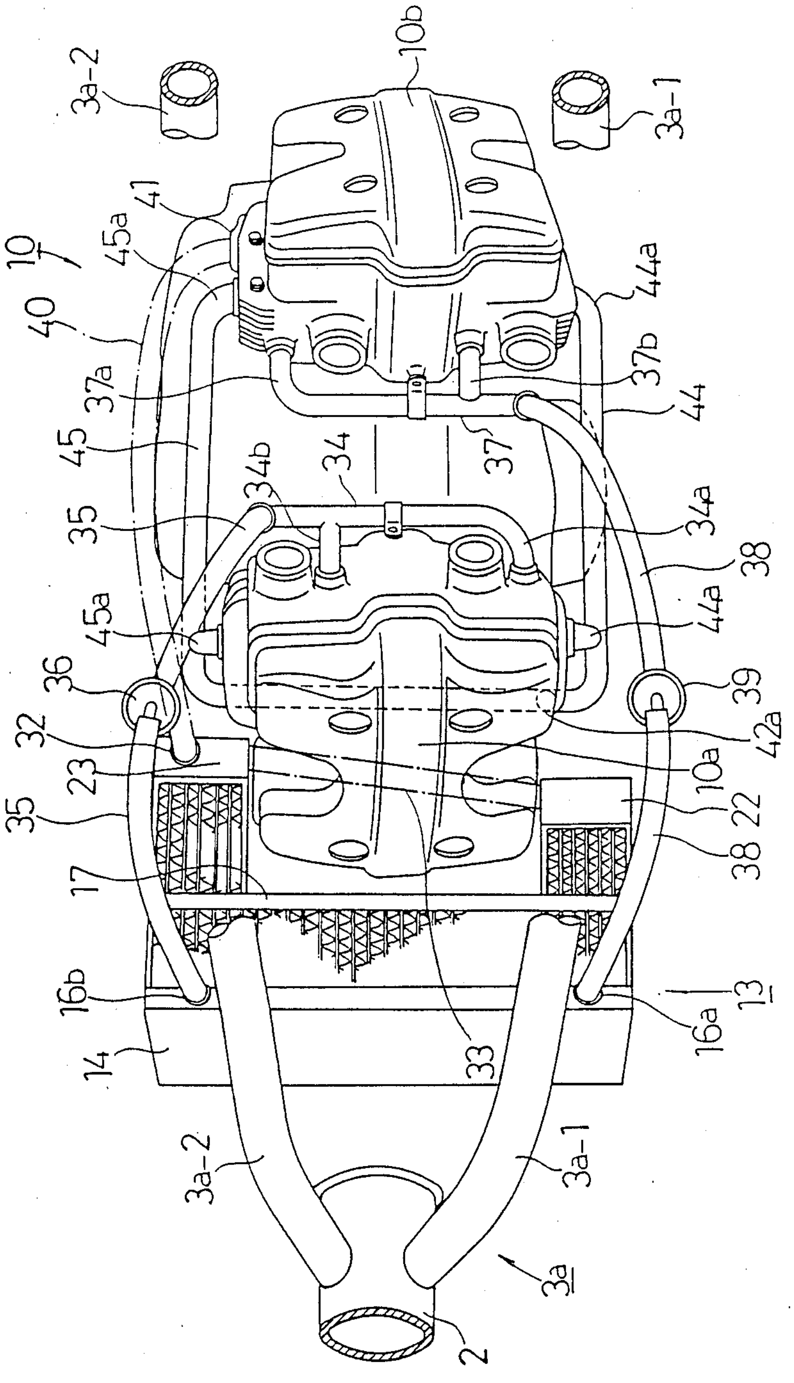
FIG. 2 is a plan view of the engine and radiator apparatus.

The piping and the flow circuits between radiator apparatus 13 and engine unit 10 will be explained with reference to FIGS. 1 and 2. First, coolant terminal hot water outlet pipe 34 is provided behind front two-cylinder engine 10*a.* The upper flow end 34*a* of pipe 34 is connected to the cylinder on one side, while the flow tube 34*b,* branching out of the middle of 34, is connected to the other cylinder. The outlet pipe 34 is connected to the coolant supply opening 16*b,* at the right of radiator apparatus 13, by means of two coolant circulation pipes 35, which are interconnected. In addition, hot water expulsion thermosensor 36 is interposed between the interconnected pipes.

In front of the rear 2-cylinder engine 10*b,* there is placed coolant terminal hot water outlet pipe 37 having its upper flow end 37*a* connected to the cylinder on one side, while the flow tube 37*b,* branching out of the middle of 37, is connected to the other cylinder. Outlet pipe 37 is connected to the coolant supply opening 16*a* at the left of radiator apparatus 13, by means of two interconnected coolant circulation pipes 38, between which is interposed hot water expulsion thermosensor 39.

By these means, coolant flows through the water jacket, a cooling circuit for engine unit 10, cooling the latter. As a result, the heated coolant (hot water) passes through the outlet pipes 34 and 37 and the circulation pipes 35 and 38, being stored in upper tank 14 by means of supply openings 16*b* and 16*a.* This hot water in upper tank 14 passes through the tubes 18, flowing into middle tank 17, and during this process the heat from the hot water is transmitted to the tubes 18 and the fins 19 and is released into the atmosphere; the hot water, having been cooled, is stored in middle tank 17. In addition, the coolant in middle tank 17 is more or less uniformly cooled.

The coolant in middle tank 17 is then further cooled in the same manner by the left and right pair of radiator cores 28 and 29. The completely cooled coolant flows into, and is stored in, lower tanks 22 and 23. At the same time, the coolant in lower tank 22 flows into lower tank 23 by means of connecting pipe 33.

In addition, coolant outlet 32 is installed in lower tank 23, coolant supply pipe 40 having one end connected to outlet 32 and its other end to the water pump 41 at the back and below crank case 10*c.* From water pump 41 main coolant supply pipe 42 (FIG. 1) extends forwardly and is interconnected with a branch pipe (not shown in the Figure) below front 2-cylinder engine 10*a.* Coolant pipes 44 and 45 branch off and connect from branch piping 42*a,* to the left and right sides of front and rear engines 10*a* and 10*b.* Pipes 44 and 45 are connected to the water jacket inlets of the 2-cylinder engines 10*a* and 10*b* by means of lower flow terminals 44*a* and 45*a.* In this fashion, coolant is supplied to each engine, front and back, left and right, by the left-hand and right-hand pipes 44 and 45.

Element 46 in FIG. 1 indicates a reserve tank, which is connected to connection 48, located above upper tank 14 of radiator apparatus 13, as illustrated in FIG. 4. Further, as shown in FIG. 4, in front of upper tank 14 there is located liquid temperature sensor 49. By means of a tube (with alcohol in it) 50, for instance, liquid temperature gauge 51 can be displayed in the center of the handle bars as a meter unit.

Figure 5:
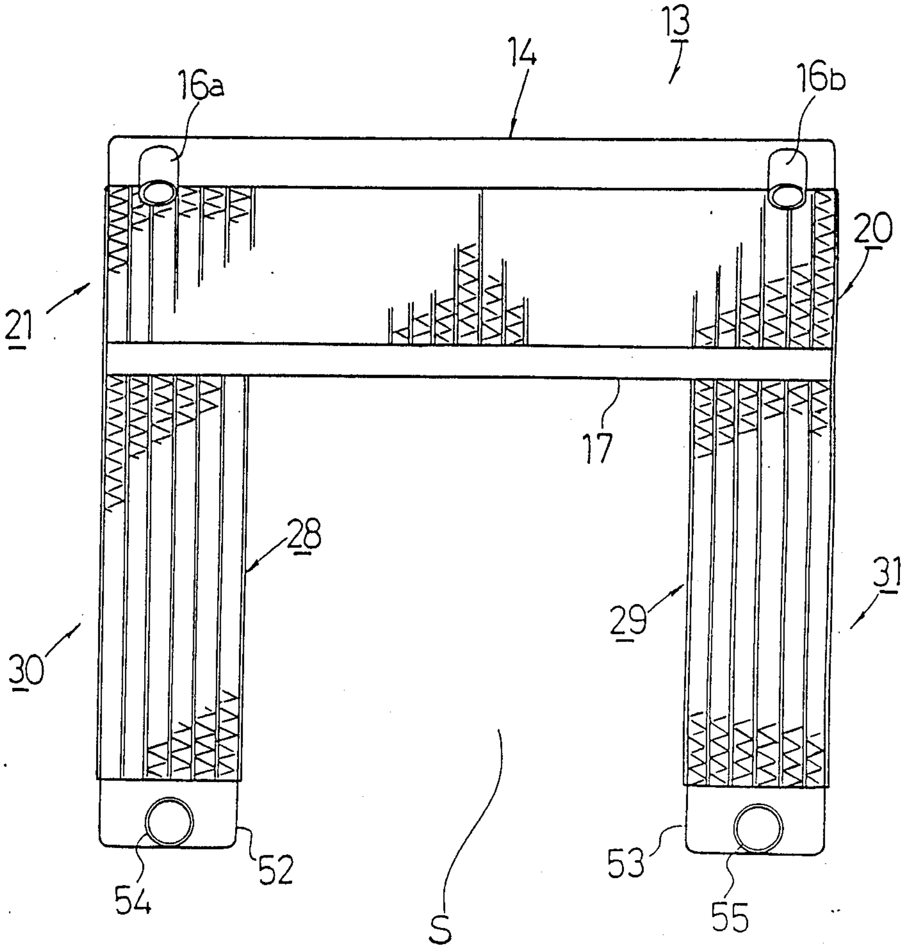
FIG. 5 is a rear view of a second embodiment of the radiator apparatus according to the invention.

A second embodiment is shown in FIG. 5. The difference between this and the first embodiment is that, while in the latter there is an outlet 32 in one or the other of the pair of lower tanks 22 and 23, and connecting the two, in the second embodiment shown in FIG. 5 each lower tank 52 and 53 has its own respective outlet, 54 and 55; coolant may be supplied independently from outlets 54 and 55 to the respective members of the pair of 2-cylinder engines 10*a* and 10*b,* respectively. In the second embodiment, two coolant supply pipes are required, but the connecting pipe 33 of the first embodiment can be omitted. Equivalent elements in FIG. 5 bear the same reference numerals as those in FIG. 3.

As will be clear from the above explanations, due to the fact that the radiator according to the present invention is concerned is constructed of multiple radiator sections, while in prior art installations, due to space limitations, it was only possible to accommodate a radiator device which was equivalent to the upper radiator section of the present invention, applicants have made possible the use of a radiator which is larger and of a larger scale.

In addition, while the shape of the radiator apparatus as a whole is not square, the tubes in the various radiator sections are all uniform, so that the coolant flows smoothly, partial flow pressures and the like are avoided, and there is uniform cooling capability, so that, while high cooling efficiency is maintained, the preservation of the tubing and the like is safeguarded.

The present invention overcomes the problem formerly associated wit large scale two-wheeled motor vehicles having lateral V-type crankshaft straddle type engines, namely, limitation of space in which to put the radiator.

It goes without saying that the radiator apparatus according to the invention may also be applied in the same fashion, in cases where the space in which to put the radiator is limited, to three-wheeled or other motor vehicles.

Figure 6:
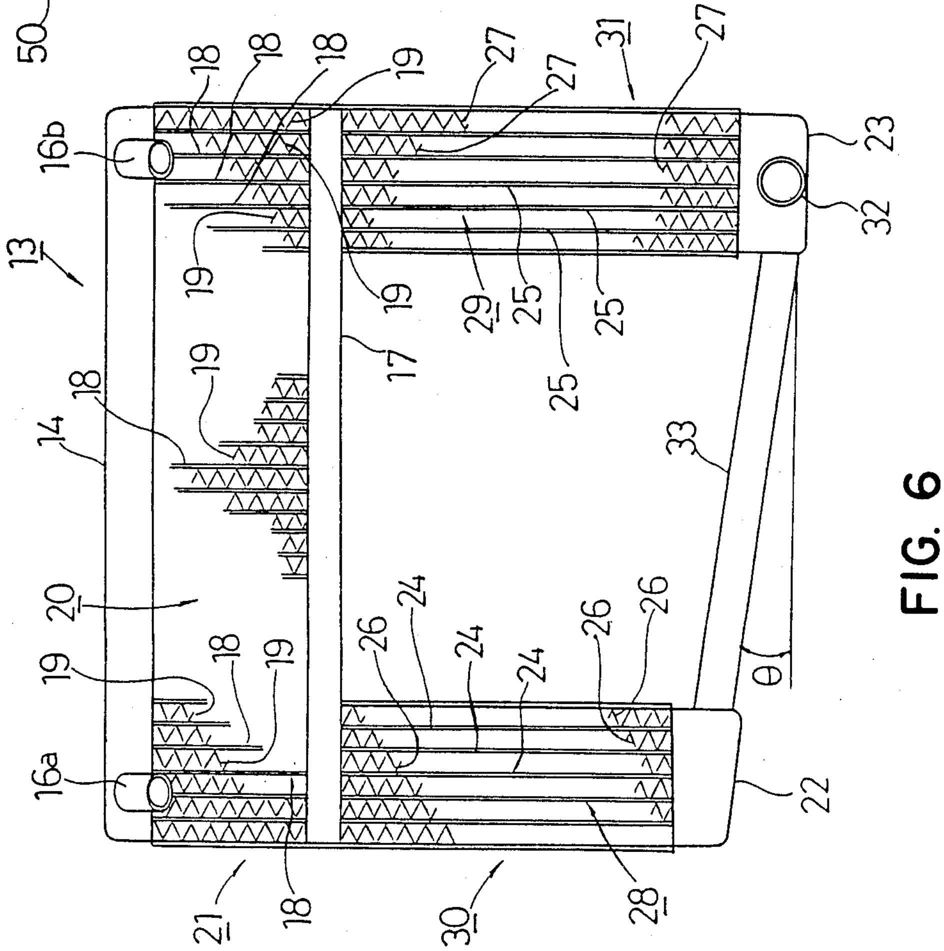
FIG. 6 is a rear view of a third embodiment of the radiator apparatus according to the invention, in which the two lower tanks are at different levels.
Figure 9:
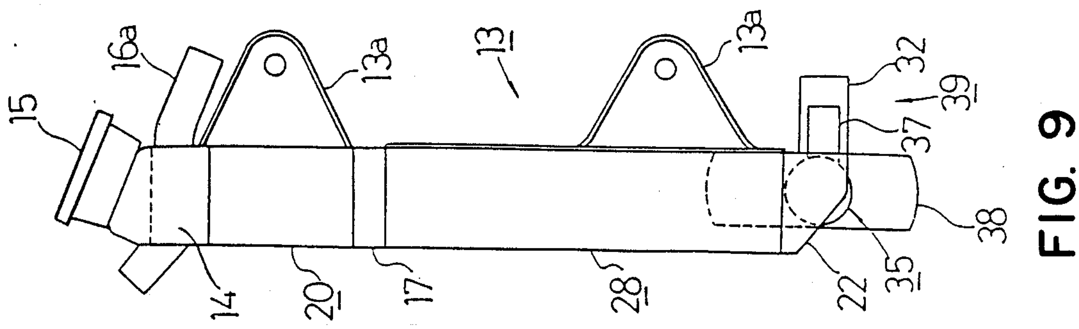
FIG. 9 is a side view of the embodiment of FIG. 8.
Figure 8:
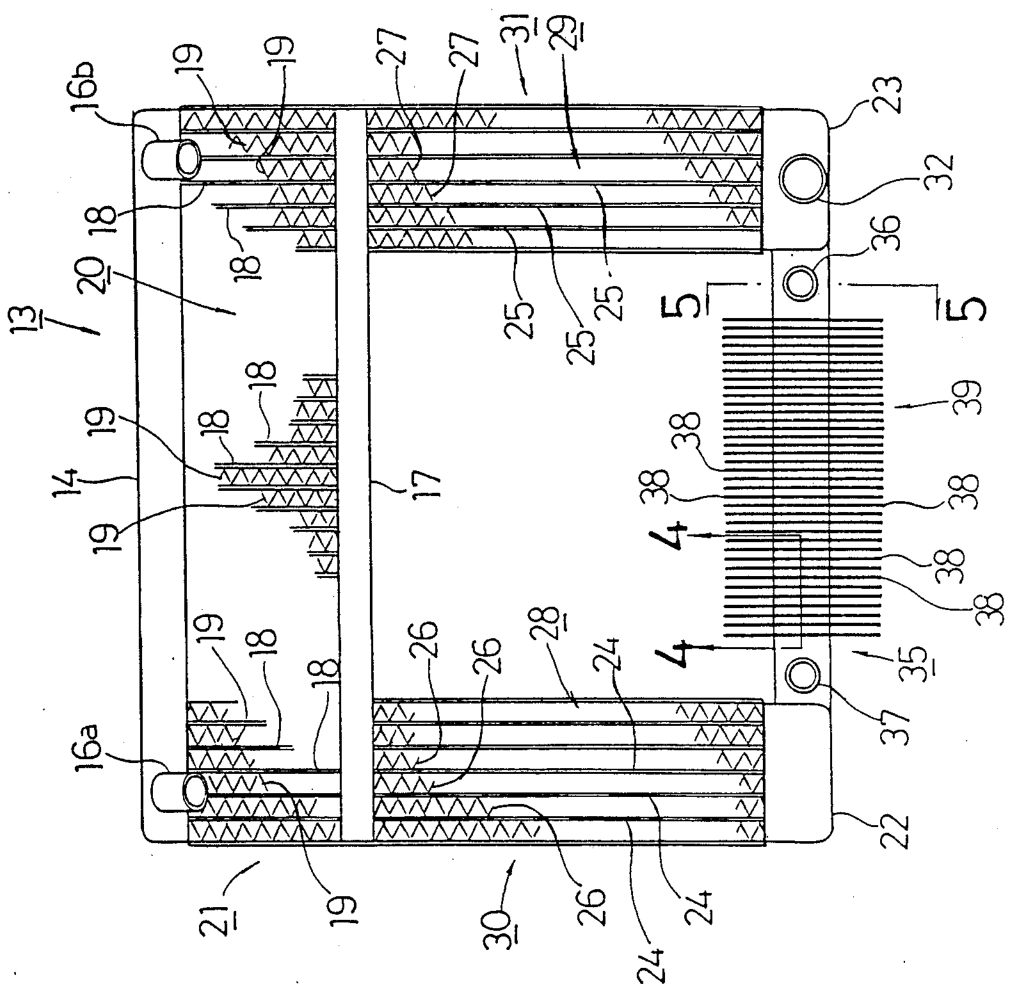
FIG. 8 is a rear view of a fourth embodiment of the invention, showing an oil cooler apparatus attached to the radiator water piping.
Figure 11:
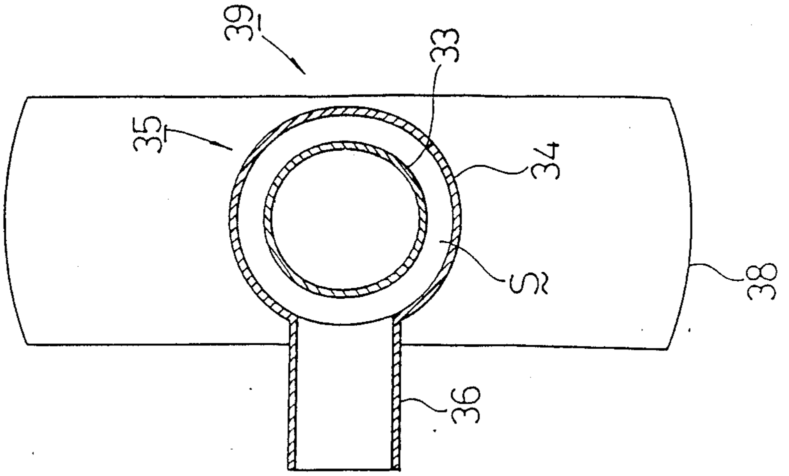
FIG. 11 is a section along line 11—11 in FIG. 8.
Figure 10:
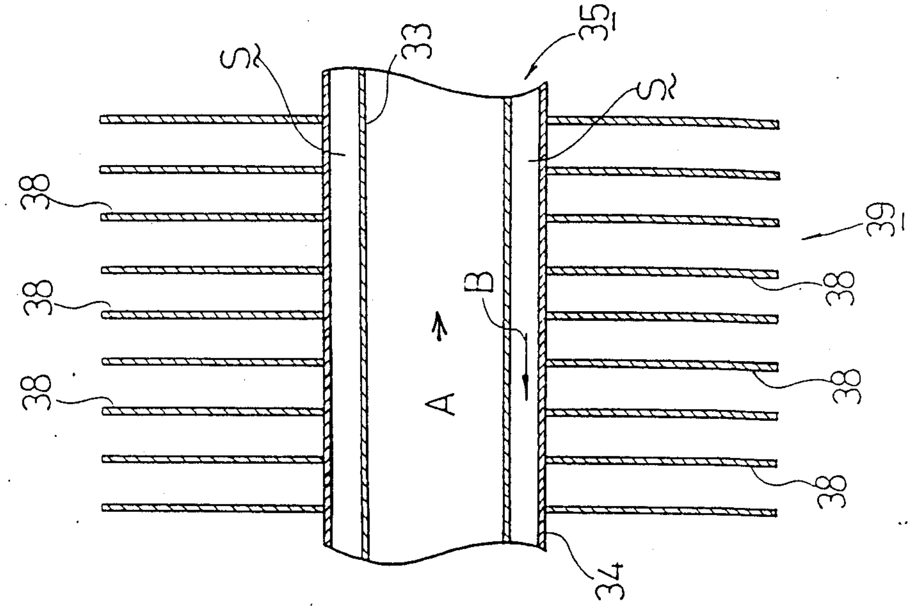
FIG. 10 is a section along line 10—10 in FIG. 8.

A further embodiment of the invention is illustrated in FIGS. 6 and. 7, showing lower tank 23 located in a lower position than lower tank 22, with connecting pipe 33 inclined at an angle $\theta$ to the horizontal, this angle being so selected that the flow speed of the coolant in radiator sections 30 and 31, i.e., through the various tubes 24 and 25, respectively, is more or less equalized. Moreover, as a result of the variance between the levels of lower tanks 22 and 23, the heights of the lower radiator cores 28 and 29 will also differ. A certain temperature difference will exist in the coolant flowing into tanks 22 and 23, respectively, but as mixing takes place in the lowermost tank 23, this present no problem. Outlet 32 is of course placed in tank 23.

Figure 7:
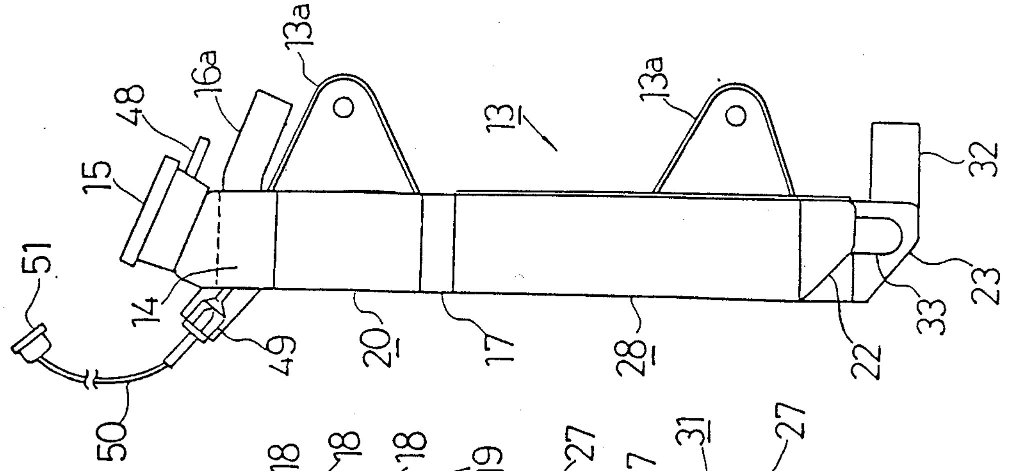
FIG. 7 is a side view of the embodiment of FIG. 6.

This embodiment of the invention addresses the problem of great flow resistance arising when no provision has been made to equalize the water temperature in the independent radiators on either side, the result being a large differential in speeds of coolant flow in the respective radiator systems. This lowers the cooling ability of the radiator apparatus, due to imbalance deterioration over time, and finally impairs performance. By equalizing the flow resistance of the coolant in the right-hand and left-hand radiator sections, the structure shown in FIGS. 6 and 7 improves cooling capability.

A further embodiment of the invention is illustrated in FIGS. 8 to 11. In this embodiment, an outer pipe 34, external to the connection pipe 33 and of a diameter larger than the latter, is arranged coaxially therewith, the two pipes jointly forming a two-layer oil cooler body 35. In this embodiment, pipe 33 connects lower tanks 22 and 23, and the coolant in lower tank 22 flows through the connection pipe 33 into lower tank 23; outer pipe 34 is welded or otherwise fastened to the sides of the walls of lower tanks 22 and 23, with the two ends of the oil circuit S formed between connection pipe 33 and external pipe 34, blocked off by the side walls of each of the tanks, and not connected with the interiors of the two tanks in any way.

Near the two ends of external pipe 34, in its outer circumference, side oil input hole 36 and oil outlet hole 37 are provided at a right angle plane to external pipe 34. At the same time, at set distances, there are placed around the outside of external pipe 34 a large number of cooling fins 38 making up the complete structure of the oil cooler apparatus 39. In consideration of the thickness of the radiator 13, the cooling fins 38 are distributed and formed in a long and thin, up and down manner.

The coolant in lower tank 22 flows through the connecting tube 33, which forms the interior of oil cooler body 35; and then into lower tank 23 at the other side; mixes with coolant already in lower tank 23, and passes through outlet 32, via an oulet hose (not shown) to engine unit 10. At this point in the process, the direction of the flow is as indicated by arrow A in FIG. 10.

As for the oil cooler apparatus 39, heated oil is supplied from the engine unit 10, via an oil pipe (not shown) connected to oil inlet hole 36 in the oil cooler apparatus 39. The oil then passes through circuit S, until it reaches outlet hole 37, when by means of an oil pipe (not shown) it is supplied back to engine unit 10. At this point in the process, the direction of the flow is as indicated by arrow B, i.e., opposite from the coolant flow. As the oil passes through the oil circuit S, it is cooled by the coolant flowing through water pipe 33, from the inside, and is cooled by the cooling fins 38 placed outside external pipe 34 as well, being cooled by both air and water cooling.

Where the oil cooler apparatus 39 is placed over water pipe 33, the coolant receives the heat from the heated oil which is flowing in the opposite direction, but since air cooling is also taking place from the other side, this presents no problem in practice. In addition, as shown in FIG. 1, radiator 13 is placed in the most advantageous position for cooling by the wind; as a result of this layout, the position selected for oil cooler apparatus 39 also results in the most effective cooling.

It will be clear that the just described oil cooler apparatus, which takes advantage of the logical combination of both air and water cooling, and thus carries out cooling with great efficiency, has an extremely simple structure because it makes direct use of the water pipes from the radiator. The result is an oil cooler apparatus of high technical and economic value, which can effectively achieve low cost because of a reduction in the number of component parts, an increase in productivity, a reduction in weight, and a reduction in the size of the oil cooler apparatus body itself.

What is claimed is:

1. Radiator apparatus for a motor vehicle comprising an engine and down tubes, said radiator apparatus being fastened to the forward portion of said down tubes and comprising one upper radiator section and two lower radiator sections unitary therewith, said upper radiator section having at least one coolant supply opening connected to said engine, said lower radiator sections being connected to said upper radiator section, each of said upper and lower radiator sections having a core comprising cooling fins, said upper radiator section comprising an elongated, horizontally extending upper tank, a core and an elongated middle tank extending substantially parallel to said upper tank and connected thereto by tubing interspersed with cooling fins, said lower radiator sections comprising two lower tanks connected by a connecting pipe, upper portions of said lower tanks being connected to a lower portion of said middle tank by tubing interspersed with cooling fins, said tubing and said fins forming said cores of each of said lower radiator sections, one of said lower tanks being positioned at a lower level than the other of said lower tanks, said connecting pipe being inclined at an angle so selected that the flow speed of coolant in said lower radiator sections is substantially equalized a front portion of said engine being located above said connecting pipe and projecting into spacing formed between said middle tank and said cores of said lower radiator sections.

2. Radiator apparatus according to claim 1, comprising an outer pipe surrounding said connecting pipe and coaxial therewith, said two pipes jointly forming a two-layer oil cooler body, two ends of an oil circuit being formed between said two pipes and being blocked off by side walls of said lower tanks.

3. Radiator apparatus according to claim 2, comprising cooling fins vertically located on the exterior of said outer pipe, and an oil inlet and oil outlet perpendicular to said outer pipe.

* * * * *

UNITED STATES PATENT AND TRADEMARK OFFICE
CERTIFICATE OF CORRECTION

PATENT NO. : 4,673,032

DATED : June 16, 1987

INVENTOR(S) : Kunitara Hara et al

It is certified that error appears in the above-identified patent and that said Letters Patent is hereby corrected as shown below:

On the title page assignee should read

--(73) Assignee: Honda Giken Kogyo Kabushiki Kaisha --.

Signed and Sealed this

Nineteenth Day of July, 1988

*Attest:*

DONALD J. QUIGG

*Attesting Officer*

*Commissioner of Patents and Trademarks*